United States Patent

[11] 3,626,505

| [72] | Inventor | Bobby L. Douglas<br>Ennis, Tex. |
|---|---|---|
| [21] | Appl. No. | 853,888 |
| [22] | Filed | Aug. 28, 1969 |
| [45] | Patented | Dec. 7, 1971 |
| [73] | Assignee | Dresser Industries, Inc.<br>Dallas, Tex. |

[54] WIRE LINE STRIPPER
3 Claims, 6 Drawing Figs.

[52] U.S. Cl. .................................................. 277/2,
277/73
[51] Int. Cl. ............................................... F16j 9/00,
F16j 15/54
[50] Field of Search .................................. 277/2, 4,
73, 11

[56] References Cited
UNITED STATES PATENTS
2,332,763  10/1943  Stewart .................... 277/71 X
2,529,744  11/1950  Schweitzer ................... 277/73
3,375,013   3/1968  Grantom ..................... 277/2

*Primary Examiner*—Samuel B. Rothberg
*Attorneys*—Robert W. Mayer, Thomas P. Hubbard, Jr., Daniel Rubin, Raymond T. Majesko, Roy L. Van Winkle, William E. Johnson, Jr., Roderick W. MacDonald and Eddie E. Scott ABSTRACT: A wire line stripper for use in conjunction with the movement of wire line supported tools into and out of well bores. The stripper includes a housing encircling the wire line, a sealing element located in the housing and having a surface thereon in engagement with the wire line. The sealing element is constructed so that the pressure responsive means continues to maintain the seal member in sealing engagement with the wire line even though considerable wear occurs on the seal surface that is in engagement with the wire line.

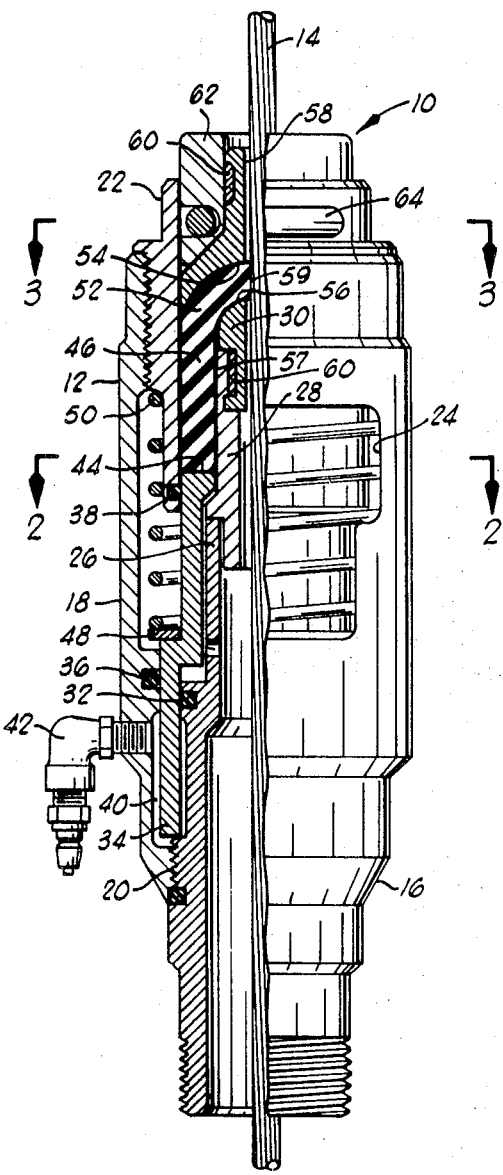
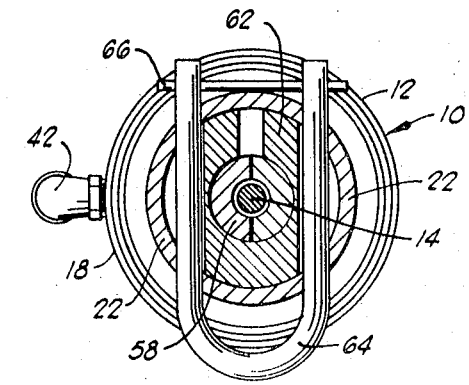
Fig.3
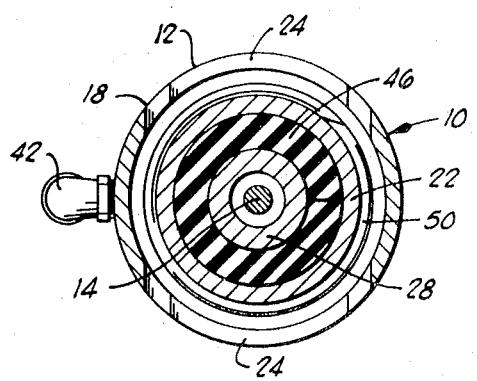
Fig.2
Fig.1
INVENTOR
BOBBY L. DOUGLAS
BY Ray L. Van Winkle
ATTORNEY

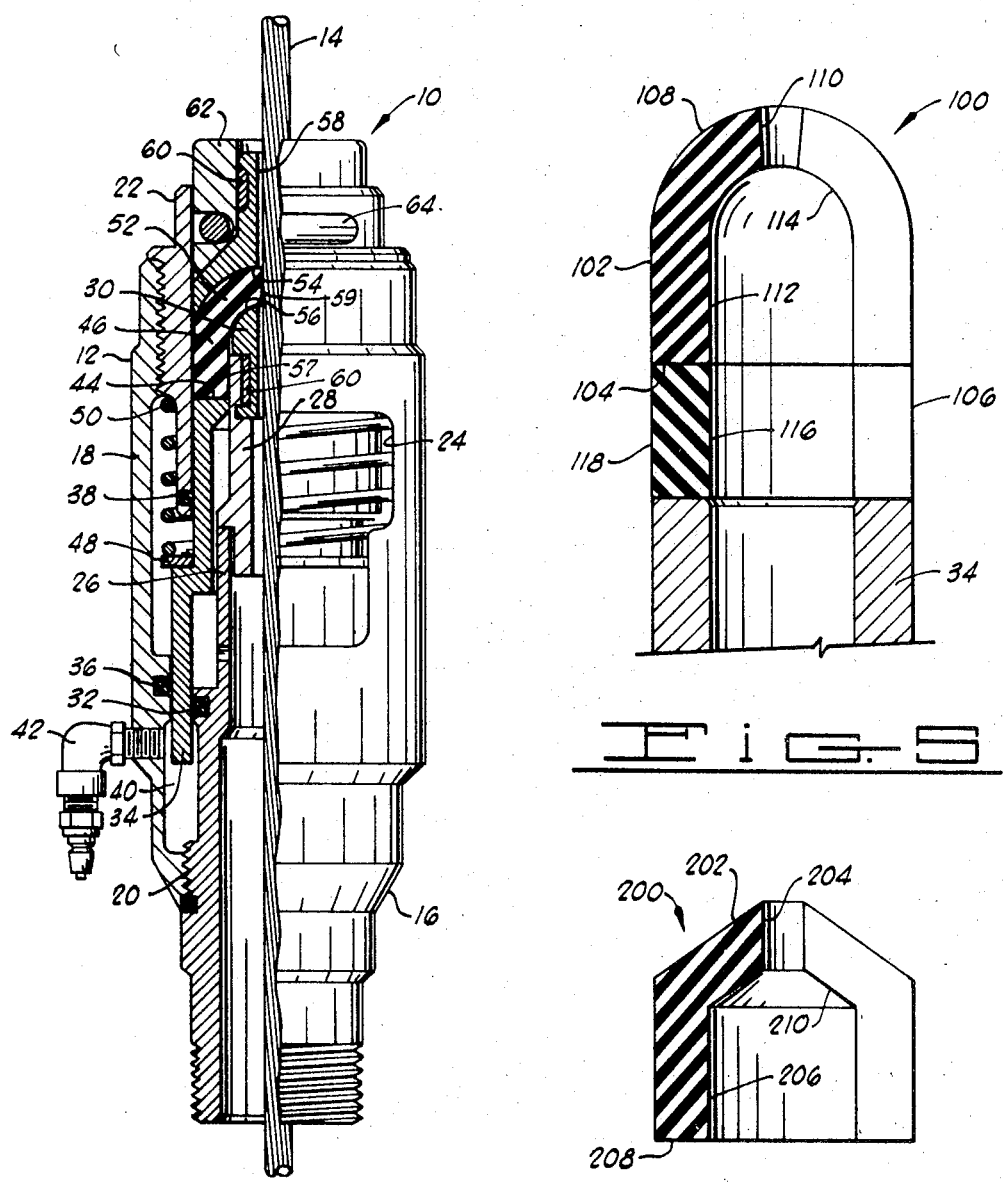

WIRE LINE STRIPPER

BACKGROUND OF THE INVENTION

This invention relates generally to apparatus for forming a seal with a wire line being run into and out of a well bore. More particularly, but not by way of limitation, this invention relates to a seal for use in a wire line stripper that provides excellent sealing and outstanding wear characteristics.

Various types of wire line oil savers or strippers have been constructed in the past. Most of these strippers have incorporated a generally cylindrical seal having truncated conical ends. The seal is disposed around the wire line. Various means have been provided for deforming the seal into sealing engagement with the wire line.

The configuration of seals previously utilized has been such that sealing engagement between the seal and wire line has occurred along substantially the entire length of the seal member. When such seals are deformed into sealing engagement with the wire line, reasonably good seals have been obtained. However, the useful life of such seals has been undesireably short because of insufficient seal material to replenish the material worn away. The desire to maintain the strippers as small as possible has limited the quantity of seal material that can be contained therein. Also, since the wear occurs along the entire length of the seal, considerable material is worn away as the wire line, which may be extremely rough is moved therethrough.

An additional problem that has been encountered is that the force required to deform the seal member into the sealing engagement with the wire line has been of such magnitude that it is extremely difficult to move the wire line through the stripper. It will be recognized, that the greater the pressure in the well, the more tightly the sealing member must be urged into the engagement with the wire line to obtain the desired seal and, thus, the greater the frictional engagement between the seal member and the wire line. It follows that the greater the pressure, the greater will be the wear on the seal member upon movement of the wire line.

This invention seeks to overcome the forgoing difficulties by the use of a shaped seal member that has a relatively small area in engagement with the wire line. As result, the seal member has a relatively low frictional engagement between the sealing member and the wire line. The reduced friction affords a greater wear life and, in addition, permits tools to be moved therethrough with less force. In fact, it has been found in testing, that an adequate seal can be maintained while permitting tools suspended on the wire line to freely move into the well bore.

The seal described herein also provided a relative large reservoir of sealing material. Thus, the seal of this invention has a considerably longer wear life than has been previously known.

One object of this invention is to provide an improved wire line oil stripper.

A further object of this invention is to provide an improved stripper that requires considerably less maintenance during its operating life.

In one aspect, this invention provides an improved seal for use in conjunction with the wire line comprising a deformable body having first and second ends, a bore passing through said first end and terminating proximate said second end, and a passageway of smaller size than the bore extending through the second end and into the bore.

In another aspect, this invention provides an improved wire line stripper that includes a housing, a seal as described hereinbefore, positioned in the housing and arranged to sealingly engage a wire line extending therethrough, and pressure responsive means mounted in the housing for urging the seal into sealing engagement with the wire line.

The foregoing and additional objects and advantages of the invention will become more apparent as the following detailed description is read in conjunction with the accompanying drawings wherein like reference characters denote like parts in all views.

BRIEF DESCRIPTION OF THE DRAWINGS

FIG 1 is a view, partially in elevation and partially in cross section, of a wire line stripper constructed in accordance with the invention.

FIG. 2 is a transverse cross section taken substantially along the line 2—2 of FIG. 1.

FIG. 3 is a transverse cross section taken substantially along the line 3—3 of FIG. 1.

FIG. 4 is a view similar to FIG. 1, but showing the wire line oil saver after wear has occurred on the seal member.

FIG. 5 illustrates another embodiment of seal member, also constructed in accordance with the invention, that is useful in the wire line stripper of FIG. 1.

FIG. 6 illustrates still another embodiment of seal member, also constructed in accordance with the invention that is useful in the wire line stripper of FIG. 1.

DESCRIPTION OF THE PREFERRED EMBODIMENT

Referring to the drawing and to FIG. 1 in particular, shown therein and generally designated by the reference character 10 is a wire line stripper constructed in accordance with the invention. As illustrated, the stripper 10 includes a hollow housing 12 that is disposed in encircling relationship to a wire line 14.

The housing 12 includes a lower housing portion 16 that has its lower end arranged to be threadedly connected with a wellhead (not shown) or other suitable apparatus for mounting the stripper 10 in operating position. The stripper housing portion 16 and an outer housing portion 18 are connected by threads 20.

The outer housing portion 18, near its uppermost end, is threadedly connected with an upper housing portion 22. A plurality of openings 24 extend through the wall of the outer housing portion 18 for purposes that will become more apparent hereinafter.

The lower housing portion 16 extends upwardly within the outer housing portion 18 and has an upper end 26 engaging an adapter 28 that supports a lower seal support member 30. Near its medial portion, the lower housing portion 16 is provided with an O-ring seal 32 that is disposed in sliding and sealing engagement with a piston 34 that is located within the housing 12. The piston 34 is also in sliding and sealing engagement with O-ring seals 36 and 38 that are carried by the outer housing portion 18 and the upper housing portion 22, respectively.

As shown in FIG. 1, the lower end of the piston 34 is disposed in a chamber 40 formed by the lower and outer housing portions 16 and 18. A quick disconnect fitting 42 is threadedly connected with the outer housing portion 18 and in fluid communication with the chamber 40 so that a source of pressurized fluid (not shown) can be connected thereto.

The upper end of the piston 34 is in engagement with a lower end 44 on a seal member 46. Pressure applied in the chamber 40 biases the piston 34 upwardly, maintaining the upper end of the piston 34 in engagement with the lower end 44 of the seal member 46.

An indicator ring 48 is positioned on the piston 34 so that it can be viewed through the openings 24 in the outer housing portion 18, and thereby indicate the position of the piston and the extend of wear on the seal member 46. A compression-type, coil spring 50 has its lower end in engagement with the indicator ring 48 and has its upper end in engagement with the upper body portion 22 so that it continually exerts a force on the piston 34 biasing it away from the seal member 46.

The seal member 46, which is split on one side as shown in FIG. 2, also has an upper end 52 having a generally hemispherical exterior surface 54 and a generally hemispherical inner surface 56, that is formed by a bore 57. It will be noted that the inner surface 56 is in engagement with the lower seal support member 30. The surfaces 54 and 56 are constructed so as to be disposed in juxtaposition with a mating surface on the lower seal support member 30 and with a mating surface on an upper seal support member 58, respectively.

The wire line 14 is located in a passageway that extends through the upper end 52 of the seal member 46 into the bore 57. The passageway forms a sealing surface 59 adjacent to the wire line 14 and is engageable therewith when pressure is applied on the piston 34.

It is preferred that the seal member 46 be constructed from a deformable material that is compatible with fluids that will be encountered during use of the stripper 10. A relatively soft, resilient material can also be successfully utilized if desired.

The upper and lower seal support members 58 and 30 respectively, are each divided parallel to the length of the wire line 14 (see FIG. 3) so that they can be separated for ease of insertion in the stripper 10 when it is necessary to replace the seal member 46. The upper seal support member 58 and the lower seal support member 30, are each provided with an exterior, annular recess that is sized to receive a C-type locking member 60. The members 60 securely retain the seal support members assembled when placed thereon.

Located in the upper housing portion 22 above the upper seal support member 58 is a support collar 62 that has its lower end in engagement with the upper seal support member 58. A locking yoke 64 extends through the upper housing portion 22 and through the support collar 62 as illustrated in FIG. 3 to prevent relative movement between the upper seal support member 58 and the housing 12. A safety locking pin 66 (see FIG. 3) extends across the open end of the locking yoke 64 preventing inadvertent loss of the yoke 64.

OPERATION OF THE PREFERRED EMBODIMENT

When the wire line 14 is positioned in the stripper 10 and pressure exists in the well bore, it is necessary to form a seal with the wire line 14. To accomplish the seal, a source of fluid under pressure (not shown) is connected with the fitting 42 and fluid pressure applied therethrough into the chamber 40. The pressure in the chamber 40 forces the piston 34 upwardly, moving the seal member 46 upwardly therewith.

As may be seen in FIG. 1, the sealing surface 59 on the seal member 46 is disposed relatively close to the wire line 14 so that the only movement of the piston 34 and the seal member 46 is that necessary to move the sealing surface 59 into tight sealing engagement with the wire line 14. The piston 34 may also move upwardly slightly due to some deformation and/or some small amount of compression that may occur in the seal member 46.

The sealing surface 59 is relatively short as compared to the overall length of the seal member 46 so that the sealing engagement between the sealing surface 59 and the wire line 14 is over a relatively small area. Since the area of engagement is small, considerable force maybe exerted thereon to form the desired seal without the development of large frictional forces between the sealing surface 59 and the wire line 14. In fact, it has been found that the friction force is low enough in the stripper 10 so that gravitational force can be utilized to move the wire 14 through the stripper 10 even when the sealing surface 59 is in tight sealing engagement with the wire line 14.

As the wire line 14 moves through the stripper 10, erosion of the seal member 46 occurs on the sealing surface 59. As the seal member 46 wears away, fluid pressure in the chamber 40 continues to bias the piston 34 upwardly. The force exerted by the piston 34 on the seal member 46 continually maintains the sealing surface 59 in sealing engagement with the wire line until the seal member 46 is substantially consumed.

It should also be pointed out that fluid pressure within the housing 12 below the seal member 46 acts on the piston 34 tending to drive it upwardly. Thus, well pressure aids in maintaining the seal member 46 in tight sealing engagement with the wire line 14.

The erosion or wearing away of the seal member 46 can be visually determined in the stripper 10 by observing the position of the indicator ring 48 through the openings 24 in the housing 12. As shown in FIG. 4, the ring 48 indicates that slightly more than one-half of the seal member 46 has been eroded away.

If it is desired to move the seal member 46 out of engagement with the wire line 14, pressure in the chamber 40 is released. Upon release of the pressure, the spring 50 moves the piston 34 downwardly away from the seal member 46 so that it can move out of sealing engagement with the wire line 14.

DESCRIPTION OF THE EMBODIMENT OF FIG. 5

FIG. 5 illustrates a modification of the seal member 46 that is designated by the referenced character 100. The modified seal member 100 can be utilized in the wire line stripper 10, if desired.

As shown in FIG. 5, the seal member 100 includes a seal body 102 having a lower end 104 that is disposed in engagement with a seal extension 106. The seal body 102 has a generally hemispherical upper end 108 and a passageway 110 that extends therethrough.

The passageway 110 extends into a bore 112 formed in the seal body 102. The bore 112 is of larger diameter than the passageway 110 and terminates in a substantially hemispherical surface 114 which corresponds to the surface 56, previously described in connection with the seal member 46.

The seal extension 106 is generally cylindrical in configuration and has a bore 116 extending therethrough that coincides with the bore 112 in the seal body 102. Similarly, an exterior surface 118 on the seal extension 106 is constructed to coincide with the exterior surface of the seal body 102. The seal body 102 and extension 106 are split to facilitate removal and replacement.

The seal body 102 is preferably constructed from a deformable and resilient material so that it will traverse the arcuate path illustrated in the wire line stripper 10 to maintain the seal body 102 in sealing engagement with the wire line 14. The seal extension 106 may be constructed from the same material utilized in the seal body 102.

Since the seal extension 106 is not intended to engage the wire line 14, it need not be constructed of a material capable of forming a seal. However, it is preferred that the material forming the seal extension 106 be capable of traversing the curved path in the stripper 10 so that essentially all of the seal body 102 can be utilized to replace the material lost as erosion occurs between the seal body 102 and the wire line 14.

It is contemplated that piston 34 and the indicator ring 48 will be at their uppermost position just prior to the time that the seal extension 106 would engage the wire line 14. The seal extension 106, which is not worn in use, can be utilized repeatedly and it is necessary only to replace the seal body 102 to keep the stripper 10 in operation.

DESCRIPTION OF THE EMBODIMENT OF FIG. 6

FIG. 6 illustrates still another embodiment of seal member, generally designated by the reference character 200, that can be utilized in a slightly modified form of the wire line stripper 10. As shown therein, the seal member 200 is of split construction and is similar to the previously described seal members 46 and 102. However, it will be noted that the seal member 200 is provided with an upper end 202 that is substantially conical in configuration.

The seal member 200 has a passageway 204 that extends through the upper end 202 into a bore 206 formed therein. The bore 206 extends upwardly from the lower end 208 of the seal member 200, terminating in a substantially conical interior surface 210. Also, it should be pointed out that the passageway 204 is substantially smaller than the bore 206 so that the passageway 204 closely encircles the wire line 14 while the bore 206 is sized to receive the necessary supporting elements, such as the support member 30 previously described.

The upper surface of the lower seal support member 30 and the lower surface of the upper seal support member 58 must be changed from the substantially hemispherical configurations illustrated in FIG. 1 to substantially conical configurations that will mate with upper end 202 and the interior surface 210 of the seal member 200 so that the stripper 10 can accommodate the seal member 200. Otherwise, the structure and operation of the stripper 10 with the seal member 200 therein are substantially identical to that of the stripper 10 containing the seal member 46.

It should be apparent from the foregoing detailed description that the stripper 10, utilizing the seal members 46, 102 and 200, provides an apparatus wherein an adequate fluidtight seal can be maintained with the wire line while at the same time, provides a relatively low frictional engagement between the seal member and the wire line so that the wire line can be readily moved therethrough. Also it should be appreciated that the particular configuration of seal members described hereinbefore provide a relatively large reservoir of seal material to continually replenish the material eroded away by the wire line 14 as it passes through the stripper 10.

It will also be understood that the embodiments described in detail hereinbefore are presented by way of example only and that many changes and modifications can be made thereto without departing from the spirit and scope of the invention.

The embodiments of the invention in which an exclusive property or privilege is claimed are defined as follows:

1. An improved stripper for use with a wire line or the like comprising:
   hollow housing means arranged to encircle the wire line, said housing having at least one opening in a wall thereof and including
   an immobile annular outer seal support projecting into the interior of said hollow housing means and having an inner peripheral surface adapted to be disposed in juxtaposition with the wire line,
   an axially extending inner seal support located within the interior of said housing means and having an upper end portion disposed in spaced relationship to said outer seal support and having a surface portion adapted to be located in juxtaposition with wire line, and
   said inner seal support and said housing means defining an annular chamber;
   an annular piston slidingly disposed in said chamber;
   seal means forming fluidtight seals between said piston and housing means and between said piston and said inner seal support;
   a deformable seal member disposed in said chamber and having a first end engaging said piston, a bore terminating adjacent a second end portion and encircling said inner seal support, said seal member being slidingly positioned between said outer seal support and the upper end portion of said inner seal support, said seal member having a passageway smaller than said bore extending through said second end portion defining a surface adapted to sealingly engage the wire line;
   pressure means in communication with said chamber adjacent the first end of said piston and arranged to exert a force on said piston to move said seal member into sealing engagement with the wire line;
   resilient means disposed between said housing and piston for biasing said piston relatively away from said seal member; and,
   indicator means visible through the opening in said housing means and moveable with said piston for indicating the wear on said seal member.

2. The stripper of claim 1 wherein:
   a surface portion of said outer seal support engaging said seal member is of hemispherical configuration; and,
   a surface portion of said inner seal support slidingly engaging said seal member is of hemispherical configuration.

3. The stripper of claim 1 wherein:
   a surface portion of said outer seal support engaging said seal member is of conical configuration; and,
   a surface portion of said inner seal support slidingly engaging said seal member is of conical configuration.

* * * * *